(12) United States Patent  (10) Patent No.: US 7,053,927 B2
Jones et al.  (45) Date of Patent: May 30, 2006

(54) SYSTEM FOR OPTIMIZING THE DISPLAY AND RENDERING OF DIGITAL IMAGES FOR DIGITAL MASTERING

(75) Inventors: David S. Jones, Fairport, NY (US); Mitchell J. Bogdanowicz, Spencerport, NY (US); Bradley W. VanSant, Macedon, NY (US); Enid Muniz, Webster, NY (US); Charles P. Hagmaier, Rochester, NY (US); Carlo V. Hume, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1069 days.

(21) Appl. No.: 09/797,901

(22) Filed: Mar. 2, 2001

(65) Prior Publication Data
US 2002/0163676 A1  Nov. 7, 2002

(51) Int. Cl.
H04N 3/36  (2006.01)

(52) U.S. Cl. .......................... 348/97; 348/96
(58) Field of Classification Search ........... 348/231.99, 348/96, 97; 375/240.19, 240.12
See application file for complete search history.

(56) References Cited

U.S. PATENT DOCUMENTS

| | | | |
|---|---|---|---|
| 4,839,721 A | 6/1989 | Abdulwahab et al. | 358/80 |
| 4,992,861 A | 2/1991 | D'Errico | 358/75 |
| 5,057,913 A | 10/1991 | Nagata et al. | 358/302 |
| 5,140,414 A | 8/1992 | Mowry | 358/81 |
| 5,189,511 A | 2/1993 | Parulski et al. | 358/80 |
| 5,239,370 A | 8/1993 | Tamaguchi | 358/518 |
| 5,255,083 A | 10/1993 | Capitant et al. | 358/527 |
| 5,319,465 A | 6/1994 | Squyres et al. | 358/310 |
| 5,335,013 A | 8/1994 | Faber | 348/104 |
| 5,374,954 A | 12/1994 | Mowry | 348/121 |
| 5,406,326 A | 4/1995 | Mowry | 348/104 |

(Continued)

FOREIGN PATENT DOCUMENTS

EP  0 350 870 A2  7/1989

OTHER PUBLICATIONS

U.S. Appl. No. 09/697,800, filed Oct. 27, 2000, filed Guimaraes et al.

(Continued)

Primary Examiner—Vu Le
(74) Attorney, Agent, or Firm—Stephen H. Shaw

(57) ABSTRACT

A digital mastering system for processing digital image signals originating from scanned motion picture film includes a film scanner for scanning motion picture film and generating a stream of digital image signals corresponding to motion picture images, a color grading channel that pre-visualizes a certain "look" that can be applied to the digital image signals and a digital rendering channel that renders the digital image signals pre-visualized for a certain "look" into a digital master. The "look" includes the appearances produced by either a standard motion picture print film and/or adjustments applied to a standard appearance to obtain a creative effect. The color grading channel includes a parameter generator for storing parameters for a plurality of "looks", a digital color grading processor for applying one or more selected parameters to impart a pre-visualized "look" to the digital image signals and a display device capable of reproducing the color graded signals. The digital rendering channel includes a digital rendering processor for applying one or more of the parameters selected by the parameter generator to the digital image signals in order to impart the rendered "look" into the digital image signals and a digital mastering device for producing a digital master from the rendered digital image signals.

27 Claims, 2 Drawing Sheets

U.S. PATENT DOCUMENTS

| | | | | |
|---|---|---|---|---|
| 5,412,773 | A | * 5/1995 | Carlucci et al. | 715/723 |
| 5,450,500 | A | * 9/1995 | Brett | 382/162 |
| 5,457,491 | A | 10/1995 | Mowry | 348/104 |
| 5,475,425 | A | 12/1995 | Przyborski et al. | 348/239 |
| 5,641,596 | A | 6/1997 | Gray et al. | 430/21 |
| 5,644,674 | A | 7/1997 | Aihara et al. | 386/52 |
| 5,646,750 | A | 7/1997 | Collier | 358/518 |
| 5,687,011 | A | 11/1997 | Mowry | 358/527 |
| 5,729,363 | A | 3/1998 | Aihara et al. | 358/906 |
| 5,809,164 | A | 9/1998 | Hultgren, III | 382/162 |
| 5,831,673 | A | 11/1998 | Przyborski et al. | 348/239 |
| 5,841,512 | A | * 11/1998 | Goodhill | 352/56 |
| 5,859,951 | A | 1/1999 | Aihara et al. | 386/107 |
| 5,880,788 | A | * 3/1999 | Bregler | 348/515 |
| 6,014,165 | A | * 1/2000 | McIntyre et al. | 348/64 |
| 6,075,887 | A | * 6/2000 | Brett | 382/167 |
| 6,226,033 | B1 | * 5/2001 | Glasgow | 348/97 |
| 6,771,323 | B1 | * 8/2004 | Dean et al. | 348/722 |
| 6,864,915 | B1 | * 3/2005 | Guimaraes et al. | 348/222.1 |

OTHER PUBLICATIONS

U.S. Appl. No. 09/712,500, filed Nov. 14, 2000, Cirulli et al.

"Digital Color Management" Encoding Solutions by Edward J. Giorgianni and Thomas E. Madden. Addison-Wesley, 1998. pp. 64-66.

"The HDTV Camcorder and the March to Marketplace Reality" by Laurence J. Thorpe, Fumio Nagumo, and Kazuo Ike. SMPTE Journal, Mar. 1998, pp. 164-177.

"A Simplified Motion-Picture Laboratory Control Method for Improved Color Duplication" by John P. Pytlak and Alfred W. Fleischer. SMPTE Journal, vol. 85, Oct. 1976, pp. 781-786.

"Digital Film Scanning and Recording. The Technology and Practice" by Glenn Kennel. SMPTE Jounral, Mar. 1994, pp. 174-181.

* cited by examiner

SYSTEM FOR OPTIMIZING THE DISPLAY AND RENDERING OF DIGITAL IMAGES FOR DIGITAL MASTERING

FIELD OF THE INVENTION

The present invention relates generally to the field of digital image processing to emulate motion picture film tone scale and color. More specifically, the invention relates to rendering an electronic image to emulate a film system reproduction, that is, to provide the appearance of an image captured and displayed with motion picture film.

BACKGROUND OF THE INVENTION

The digital era that is now upon us has the potential to change the way everyone operates in the motion picture field. The traditional method for projecting motion picture film was relatively simple because there were not very many options available to be controlled. Basically, film has a certain appearance or "look" that can be altered by processing, lighting and laboratory methods. The digital age has brought to the motion picture industry the ability to capture a motion picture print image and structure it in the form of data. Once the data has been captured, it can be manipulated practically to any degree that is desired. However, the more variables one has to work with, the harder it is to maintain or reconstruct the original intent.

A very large amount of program material potentially useful for electronic conversion exists, or is captured, in the form of photographic film. The type of equipment capable of producing digital signals from such film material is usually called a telecine scanner, or telecine for short. However, a motion picture film that, when projected in a dark auditorium, appears to be of perfectly satisfactory quality, may prove disappointing when converted for electronic viewing by means of a telecine. For this reason, it is possible to apply very useful adjustments to the pictures electronically. These corrections are typically applied by a colorist working in a telecine lab, and the corrected electronic signals are written out to a digital intermediate, such as a hard drive or other type of digital memory. In the terminology of the industry, the colorist "grades" the scanned film to an optimum "look" for film or video output based on a CRT monitor. This requires a lot of guesswork on the part of the colorist when the data is committed to film.

Today colorists in a digital mastering or telecine lab are somewhat limited in the viewing environment available to them while adjusting the tone scale and color of a digital image originating from scanned motion picture film or other digital capture device in order to produce an acceptable digital master. Equipment such as waveform monitors and vectorscopes can monitor the vast adjustment capabilities resulting from telecine and/or secondary color correction yet the motion imagery is typically displayed during this color grading process using a video monitor with a color gamut that is smaller than the scanned film. Additionally, the current process for injecting a desired "look" (such as that of a release print film) while color grading, typically relies on 1-dimensional hardware look up tables (1D LUTs) implemented within these limited gamut video devices and the subjective creative control of a colorist. (The 1D aspect of a LUT means that one output value is looked up for each input value.)

In the prior art, a given "look" can be attained through various adjustments using "primary" or "secondary" color correctors, such as da Vinci™ color corrector offered by da Vinci Systems Inc., with or without a telecine machine. In the patent literature, U.S. Pat. No. 5,255,083 describes a digital color correction system and method for color correction in a film-to-video signal conversion system. U.S. Pat. Nos. 5,140,414; 5,374,954; 5,406,326; 5,457,491 and 5,687,011 (each issued to Mowry) represent a family of related post-production video technology that seeks to arrive at an aesthetically acceptable simulation of the appearance that images originated on different motion picture film stocks would embody after telecine "flying spot scanner" transfer to video from taped high definition video originated images. One component of this prior art technology deals with the conversion of the video-originated material through a LUT that is based on color temperature of the scene lighting, scene brightness and selected f-stop setting. The conversion values in the LUT are derived by filming color charts and grey scale charts, obtaining a digital representation of the film component responses of the charts from telecine transfer of the film to videotape, and then charting the telecine-derived component responses against video originated images of the same charts under identical lighting conditions. The final simulated video image is either recorded as a high definition signal, or converted to an NTSC signal and broadcast or displayed.

In the latter two of the aforementioned Mowry patents, the digitized video signal may be sent to a film recorder, which reproduces the component-modified images onto a selected, reversal film stock. The film is chemically processed with a film processor and then optically projected, or scanned to video, digital video, or other electronic media. If the film recording option is employed, these patents specify that it is important that the telecine-derived LUT used in the component modification involves response data which compensates for the inherent color response of the film stock on which the images are being digitally recorded.

These systems may be able to come perceptually close to achieving a given "look" through trial and error, but have a tendency to introduce noise or other artifacts into the imagery in the process and are time consuming. In addition, there are colors that cannot be easily attained using conventional 1D look up tables (1D LUTs) and 3×3 matrices that may result from non-linear channel interdependencies.

What is needed is a straightforward robust method for emulating known "looks" (e.g. release film print) in real time on motion imagery with an expanded color gamut as part of an overall system that is capable of providing otherwise unattainable colors, all the while complementing existing products that perform color correction on motion imagery.

SUMMARY OF THE INVENTION

It is an object of the invention to provide a system that allows a "look" (e.g., of a print film) to be applied to digital motion data in real-time and to pre-visualize that "look" using a display device, such as a digital projector.

It is a further objective of the invention to provide a color grading system that allows optimal operation within the limited color gamut of a display device, and as part of an overall system that includes a custom hardware image processor that can achieve real time performance and improve the overall process.

It is a further objective of the invention to use high speed LUT technology as a component in a series of configurable processing modules that allow the system to provide the "look" and obtain the otherwise unobtainable colors.

It is a further object of the invention to use a digital projector with an expanded color gamut as part of an overall system that includes a custom hardware image processor (e.g., including a 3D LUT or multiple 1D LUTs and 3×3 matrices) in order to improve this process.

The present invention is directed to overcoming one or more of the problems set forth above. Briefly summarized, according to one aspect of the present invention, a digital mastering system for processing digital image signals originating from a motion image source, such as scanned motion picture film, includes a color grading channel and a digital rendering channel. The color grading channel pre-visualizes a "look" that can be applied to the digital image signals, wherein the "look" includes the appearances produced by either a standard motion image source, such as motion picture print film, and/or adjustments applied to a standard appearance to obtain a creative effect. To do this, the color grading channel includes (a) a parameter generator for storing parameters for a plurality of "looks" corresponding to one or more standard motion image sources and creative effects, (b) a digital color grading processor for applying one or more selected parameters to impart a pre-visualized "look" to the digital image signals, wherein the digital color grading processor also applies one or more transforms to the digital image signals that are specific to a particular display device, thereby producing color graded signals that include the pre-visualized "look" and the display specific transforms, and a (c) a display device that reproduces the color graded signals as modified by the display specific transforms.

The digital rendering channel renders the digital image signals pre-visualized for a certain "look" into a digital master, wherein the rendered "look" includes the appearances produced by a standard motion image source and/or adjustments applied to a standard appearance to obtain a creative effect. To do this, the digital rendering channel includes (a) a digital rendering processor for applying one or more of the parameters selected by the parameter generator to the digital image signals in order to impart the rendered "look" into the digital image signals, thereby producing rendered digital image signals that include the rendered "look" but are devoid of display specific transforms and (b) a digital mastering device for producing a digital master from the rendered digital image signals.

The invention provides the capability for a colorist to have an optimal view of the displayed results of color grading operations using a digital projector in a post-production facility. The invention includes configurable processing steps that are implemented in hardware as 1 or more 3-dimensional look up tables, multiple 1-dimensional look up tables, and multiple 3×3 matrices loaded into a re-configurable compute engine. This compute engine will process motion imagery input from a digital source in real-time and send the optimized output to a digital projector or digital data storage device.

ADVANTAGEOUS EFFECT OF THE INVENTION

This invention allows for a colorist to more accurately color correct a digitized film source through a system that provides an appearance (and possibly a colorimetric) match between the digitally projected digital source imagery and the desired end product (e.g. a projected release film print). This is an improvement over reliance on a limited color gamut device such as a video monitor. Visualization of external color adjustments made in this "color grading" process is optimal. The display-only scenario of the system allows for the pre-visualization processing to be customized to incorporate projector specific transformations to emulate the desired end product "look" on any given digital projector.

The "digital master" that can be created in a rendering process will more accurately reflect colorists' or other interested stakeholders' intentions and expectations. The color and tone scale of the motion imagery products (e.g. release film prints) that can ultimately be produced from the digital master will thus be optimized.

Various end products (e.g. digital cinema distribution master or release film print) from the same digital master can be optimally pre-visualized through simple changes to this system's 3D look up table setup parameters using the same digital projector to achieve a consistent desired "look" across all end products.

Any number of experimental "looks" can be rendered into the source imagery if desired when the system is used in a rendering mode. This presents an opportunity for cost and time savings over existing traditional methods for achieving a particular "look" (e.g. a "look" resembling what might be achievable through traditional film chemical lab processes) in the overall post-production process.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
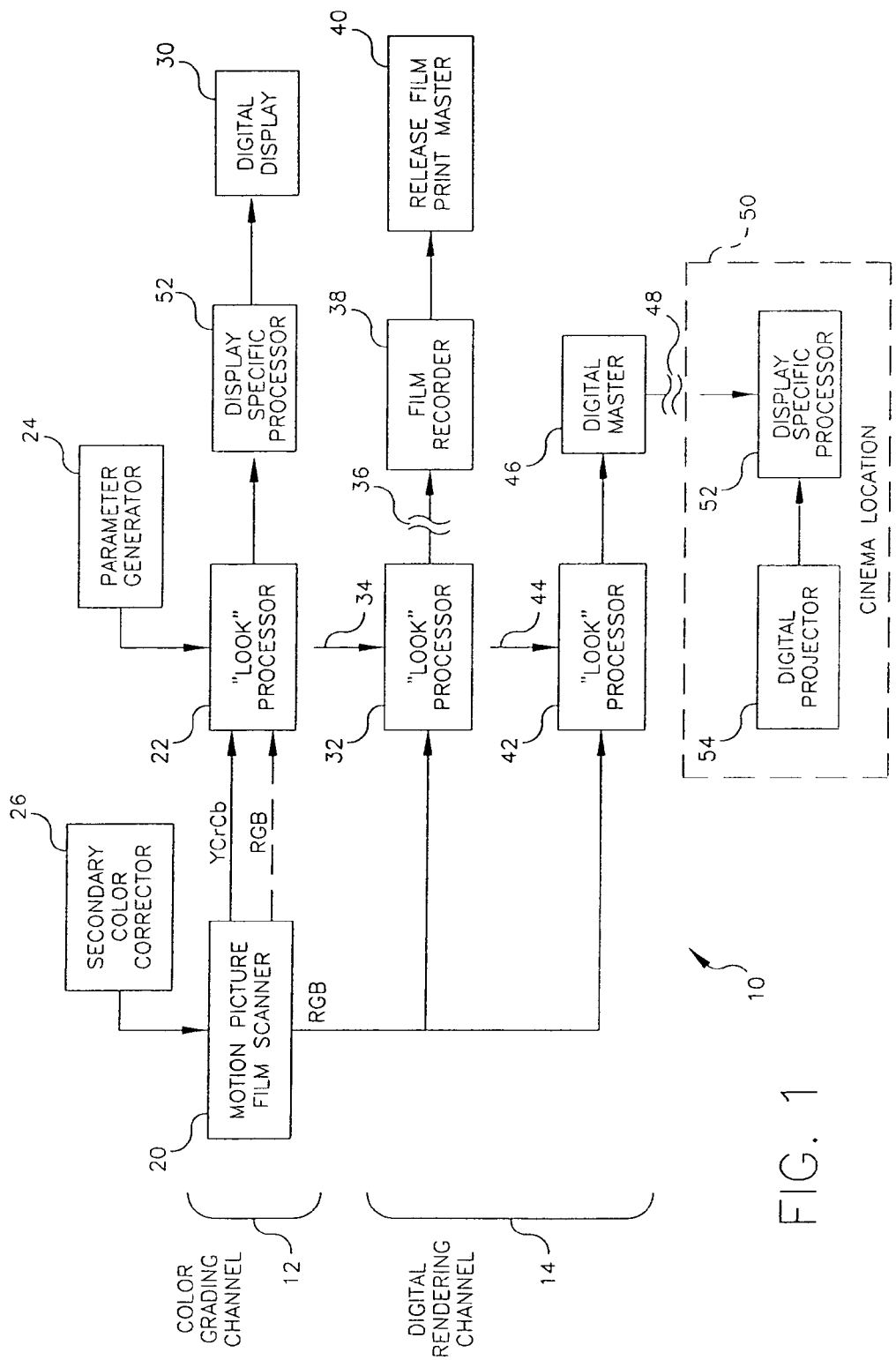
FIG. 1 is a block diagram of a digital mastering system according to the invention, involving a digital color grading channel which allows a colorist to pre-visualize a particular "look" and a digital rendering channel which allows the colorist to render that "look" into the mastered data.

Because video or digital image processing systems that emulate the "look" of motion picture film, particularly after telecine conversion, are well known, the present description will be directed in particular to attributes forming part of, or cooperating more directly with, a system and a method in accordance with the present invention. Attributes not specifically shown or described herein may be selected from those known in the art. In the following description, a preferred embodiment of the present invention would ordinarily be implemented at least in part as hardware, although those skilled in the art will readily recognize that the equivalent of such hardware may also be provided in software. Given the system as described according to the invention in the following materials, the design of the hardware and software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program. If the invention is implemented in hardware, it may be implemented as an integrated circuit, such as an application specific integrated circuit (ASIC), or by other means known in the art.

This invention encompasses the real-time color processing that would occur on the image data stream between the machine producing the image data stream, such as a telecine or a digital data storage device, and a display device such as a digital projector in a digital mastering or telecine suite, a film recorder or a digital master rendering device.

The real-time color processing capabilities of this system would provide an optimal way of interpolating colors captured on film that are outside the color gamut of a given projector (or other targeted viewing device) and allow each display device to be characterized individually. Additionally, a film-like "look" or other creative "look" can be applied to the data stream (with or without rendering the "look" into the data) using this system in a "digital intermediate" environment.

The invention is composed of a set of reconfigureable hardware processing elements that can be configured with data that manipulates motion imagery in a digital mastering environment. This data allows the operator to inject a given "look" on that data that can either be "rendered" to a storage device in a rendering mode, or digitally projected in a display-only mode. More specifically, this invention provides a system that:

Allows an optional display-only "look" to be applied to the data stream in real-time to pre-visualize the "look" and any externally applied color and tone scale adjustments without actually rendering the "look" into the digital source data. Furthermore, this system optimizes the source imagery for the color gamut of the digital projector displaying the output of this system. This is shown in a color grading preview channel 12 in FIG. 1.

Allows an optional creative "look" to be rendered into the data (i.e. into a digital master) devoid of projector specific transforms. This is shown in a digital rendering channel 14 in FIG. 1.

Referring to FIG. 1, a digital mastering system 10 includes a color grading preview channel 12 and a digital rendering channel 14. Both channels 12 and 14 process digital motion picture signals from a motion picture film scanner 20, such as the SpiritDataCine™ telecine offered by Philips. However, the data that can be operated on is essentially digital image data from any given digital motion image source, such as a digital camera, a digital computer (computer generated images, animations, etc.) or a digital storage device containing a source of digital motion images. In practice, although the invention does not inherently limit the scope of the input format in any way, the data needs to be provided in a format supported by the system. A typical scanner provides YCbCr signals in the color grading channel 12 and RGB signals in the digital rendering channel, although RGB signals could be provided in both channels.

In the color grading channel 12, the YCbCr signals are modified in a "look" processor 22 to apply a certain "look" to the signals. In the context of this disclosure, "look" is meant to include without limitation the appearance produced by the tone scale and colorimetry of a standard digital image source, such as source imagery from a digital camera, computer generation or a motion picture print film, and the adjustments a director would apply to a standard appearance to obtain a creative effect. For example, a standard "look" might be the tone scale and colorimetry generated by printing and projecting Kodak Vision Print Film 2383™, and a creative adjustment might be the effect obtained by applying a skip bleach process to that source, doing print exposure flashing, offsetting the balance position, adding or recreating the tone, scale and colorimetry of a discontinued film product, or the like.

The creative and standard film "look" parameters are input from a parameter generator 24, which allows a myriad of different "looks" and creative effects to be imparted to the digital signals. The parameters are either pre-calculated values, e.g., a set of LUT entries, or could be generated contemporaneously in response to a colorist's input. In the preferred embodiment, the "look" processor 22 is a reconfigurable compute engine, and parameter generator 24 can provide a plurality of pre-computed parameters for various "looks" and creative effects. In addition, a secondary color corrector 26, such as the da Vinci™ color corrector, may be utilized to provide additional color correction either as part of the scanning process (as shown) or elsewhere in the process. In fact, the invention complements the fine tuning color and tone scale adjustments made with the telecine and/or secondary color correctors while color grading. In addition, the invention provides a better starting point for such corrections.

The processed digital signals are then viewed on a digital display device 30, which is preferably a wider-gamut device such as a digital projector. Projectors suitable for this purpose are generally available, and include the DLP Projector offered by Texas Instruments Corporation and the G4000 Projector offered by JVC Corporation. Because certain signal transformations are required by specific display devices, the "look" processor 22 also applies display specific transforms to the digital signals. As with the "look" parameters, the parameter generator 24 may allow for transforms appropriate for a plurality of display devices. A particular display specific transform that is of interest is an algorithm for re-mapping any output values that are out of the gamut of the display device such that such values would be within the display device gamut. In one aspect of the invention, use of a digital projector provides a wider gamut than a conventional CRT display device and can display a broader range of colors, albeit some colors provided by the "look" processor 22 that are out of gamut would be re-mapped into the gamut of the digital projector by means of the appropriate display specific transform. In this manner, an optimal display environment is provided.

In a film recording path of the digital rendering channel 14, the RGB signals are modified and adjusted in a "look" processor 32, which operates similarly to the "look" processor 22 except that only the creative effects are applied (the standard film "look" is inherently imparted by the film processing and usage). The specific parameters generated by the parameter generator 24 for the color grading channel can also be input on a line 34 to the "look" processor 32. The processed signals are either recorded on an intermediate master 36 or applied directly to a film recorder 38, which converts the processed digital signals into optical signals that expose a release film print master 40. Distribution prints are then obtained from the master 40.

In a digital projection path of the digital rendering channel 14, the RGB signals are modified and adjusted in a "look" processor 42, which operates similarly to the "look" processor 22 except that display specific transforms are not imparted to the signals. The specific parameters generated by the parameter generator 24 for the color grading channel can also be input on a line 44 to the "look" processor 42. The processed digital signals are then recorded as a digital master 46, such as magnetic tape, a hard drive or a CD/DVROM. (Alternatively, the display data may be directly transmitted to the location of the digital projector, e.g., by a satellite transmission linkage.) Many digital copies 48 are then copied from the digital master 40 and distributed to a plurality of cinema locations 50, where they are modified in a processor 52 with projector specific transforms and projected for a viewing audience with a digital projector 54.

It should be understood that several variations of the digital projection path of the digital rendering channel 14 may be practiced. In one variation, the projector specific transforms may be implemented by the "look" processor 42 if the requirement of the specific projector 54 is known during the rendering stage. In another variation, all of the "look" and creative parameters may be stored, e.g., on the digital master 46, and distributed via the copies 48 to the cinema locations, where the processor 52 would have the capability of processing the "look" and creative parameters in place of the "look" processor 42 (in which case, the "look" processor 42 could be inactivated or eliminated).

Figure 2:
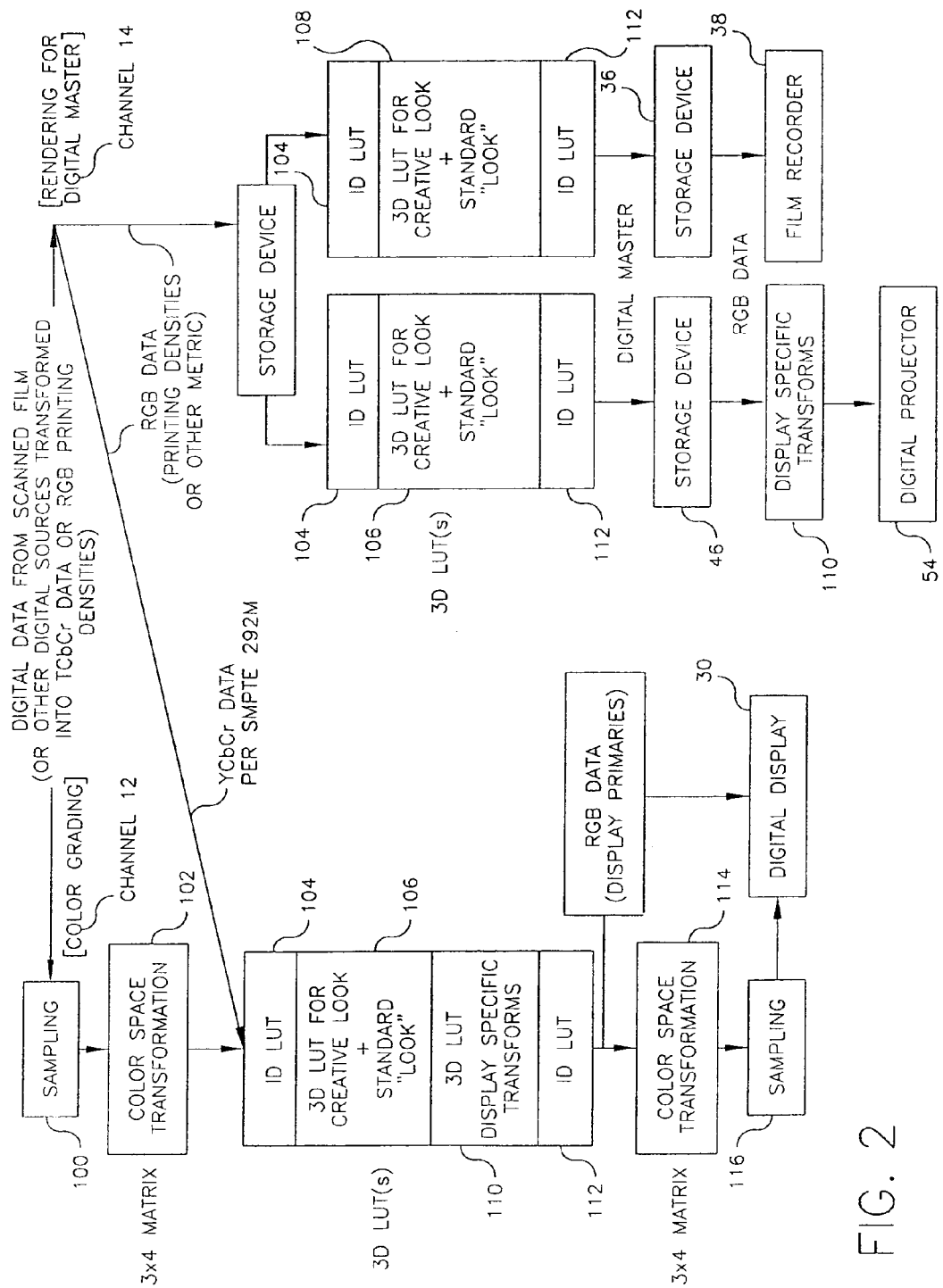
FIG. 2 is a block diagram of the processing stages involved in generating the particular "look" in each of the channels shown in FIG. 1, which in a color grading view-only scenario of the invention allows a colorist to pre-visualize the "look" and any externally applied color and tone scale adjustments without actually rendering the "look" into the digital source data, and which in a digital rendering scenario of the invention allows the colorist to render creative "looks" into the data (i.e. into a digital master) devoid of projector specific transforms.

Referring to FIG. 2, the processing stages implemented by the "look" processors 22, 32 and 42 in the in the color grading channel and the digital rendering channel are presented side-by-side to emphasize similarities and identify differences. Recalling that the motion picture film scanner 20 may provide YCbCr data or RGB printing densities, if YCbCr data conforming to an input standard such as SMPTE 292M is provided to the color grading channel 12, a sampling stage 100 provides up-sampling of source component pixel information from the input standard to the sampling ratios of the color space expected by the subsequent 3D LUT processing step (e.g. from a 4:2:2 YCbCr sampling ratio to a 4:4:4 YCbCr sampling ratio). In the digital rendering channel 14, however, this step would be unnecessary as the source imagery should already be in a fully sampled (4:4:4) RGB color space in a format such as SMPTE DPX format (e.g. as film "printing densities"). (Staying in an RGB color space is considered one industry standard way of maintaining color fidelity when color processing motion imagery.)

It may then be necessary to provide a color space conversion from the source color space to an internal color space of the system. For instance, in a color space transformation stage 102, the source color space is converted (e.g., by a 3×4 matrix conversion) to the color space expected by the subsequent 3D LUT processing step (e.g. from a 4:4:4 YCbCr color space to a 4:4:4 RGB printing density color space). However, in the digital rendering channel 14, this step would be unnecessary as the source imagery should already be in an RGB printing density color space.

Next, the digital signals in each channel are processed in a sequence of look up tables (LUTs). First, bit depth scaling of the digital image signal source from 10 bits/channel to 12 bits/channel is performed in a scaling step, using a 1D LUTs 104 in each channel. This LUT is also used to implement a function to allow for non-linear interpolation between nodes of a 3D look up table that otherwise would be linear as implemented in the hardware due to the inherent fixed spacing between the nodes of the 3D LUT in hardware. Additionally, any traditional 1D LUT processing (e.g. gamma adjustment) can be implemented at this point. The distinguishing element within the workflow of the invention is the application of a re-configurable 3D look up table ASIC (in combination with the other matrices and 1D look up tables implemented in FPGA hardware) in a group of 3D LUTs 106, 108 and 110. A 3D LUT provides a known technique of interpolation over a regular grid of points, or nodes, in three dimensions, where the input is a triad (e.g., RGB) of values and the output is a triad of processed values. Color processing is obtained by using 12 bit image data through the 3D LUT ASIC, enabling a colorist to add a given "look" to the data stream (e.g. a specific release print film "look" or other creative "look").

Commonly-assigned, copending U.S. Ser. No. 11/227,757 "Method of Digital Processing for Digital Cinema Projection of Tone Scale and Color", filed on even date herewith in the names of M. J. Bogdanowicz, C. V. Hume and C. P. Hagmaier, which is incorporated herein by reference, describes in detail the chain of image processing that is implemented by means of the 3D LUTs 106, 108 and 110. Briefly summarized, that disclosure describes a method for processing a sequence of digital image signals in order to match the appearance of a particular display medium, such as a motion picture print film, including the steps of (a) converting the digital image signals into signal values in an analytical dye amount space where the signal values are proportional to a dye set corresponding to the particular medium; and (b) converting the signal values in analytical dye amount space into output values suitable for a display device, such as a digital projector. Moreover, the signal values in analytical dye amount space may be corrected for viewing conditions, such as printing flare, gamma, contrast ratio or neutrality. There are other aspects to the disclosure, including the steps of: converting the signal values in analytical dye amount space into a perceptual color space based upon a chosen illuminant for display of the image signals; and converting the signals in the perceptual color space into output values suitable for a display device.

Copending U.S. Ser. No. 11/227,757 provides a fast and reliable process for matching a digital source to a motion picture print film release. It therefore greatly minimizes the work involved by a colorist to adjust the flesh tone and colorimetry of image sequences, therefore saving time and enabling the use of digital cinema projection. The method employed transforms the digital image sequence by simulating a "film model" for characterizing how film dyes appear when viewed with light. The tone scale and tone scale manipulations are operated on in a channel independent space, preferably a space referred to as an Analytical Dye Amount space. Analytical dye amounts are linear proportions of the individual cyan, magenta and yellow dye spectrophotometry. The target "look" for a film based emulation is constructed from the appearance of the image made from cyan, magenta and yellow dyes. The choice of Analytical Dye Amount space allows the balancing (shifting) of the tone scale curves without imparting errors due to cross talk between the channels. The dye amounts are then converted and mapped to the target digital projector. Consequently, the 3D LUTs 106, 108 and 110 use table values based on the analytical densities that are used to transform a digital image sequence to the target film model. The parameters for the plurality of film "looks" and special effects, as well as the display specific transformations, would be stored with the parameter generator 24 as table values for the 3D LUTs 106, 108 and 110.

Basically, as described in the commonly-assigned, copending U.S. Ser. No. 11/227,757, the image processing chain represented in the separate LUTs 106, 108 and 110 can each be represented as a mathematical model. For each RGB input set, there is a potential unique set of output RGB values defined by the mathematical model. The modeling processing is independent of implementation. For this work, a fast method of computation is needed to perform the conversion. A tetrahedral 3D interpolation method is used to simplify the amount of modeling calculations necessary to be made. Detailed information regarding a tetrahedral 3D interpolation can be found in commonly-assigned U.S. Pat. No. 4,992,861, which is issued to John D'Errico and incorporated herein by reference. For this reason, the key processing steps are implemented in the reconfigurable "look" processors 22, 32 and 42 as programmable 3D LUT ASIC chips, or other high speed hardware, that preferably implement the 3D LUT processing described in the D'Errico patent. This is important since the system is intended to operate in real time.

The bit depth scaled signals are processed in the LUTs 106, 108 and 110 to provide the tone scale and color modeling associated with the creative "look" and the standard "look", and with the specific transforms required by the digital projector. The standard "look" is preferably that of a motion picture film projection system, while the creative "look" covers the modifications and adjustments applied by the director to the standard "look" to achieve the particular creative expression desired. Basically, in the color grading channel 12 the LUT 106 applies the creative "look" and the standard "look", while the LUT 110 applies the display specific transforms. Alternatively, all three adjustments could be done in one LUT, or the adjustments could be separated into three separate LUTs.

The color re-mapping method employed in the aforementioned commonly-assigned, copending U.S. Ser. No. 11/227,757 is an example of a particularly useful display specific transform in the context of this invention. That re-mapping method employs the following methodology to process a color set that is out of gamut. First, the maximum color gamut of the display device is determined in a device-independent perceptual color space. The chosen perceptual color space is CIE LAB, which is well understood by those of skill in these arts, but any other perceptual color space, such as XYZ tristimulus or CIE LUV space, would work as well. In CIE LAB space, the maximum color gamut is determined by setting the maximum saturation at each of the hue angles and calculating the Lightness value (L) at each point. The calculated Lightness value is used as a starting position for relocating a color that is out of gamut. Then the hue angle is obtained for each out of gamut color. This hue angle is used to lookup the starting Lightness value for the working color.

This gamut re-mapping algorithm attempts to conserve the hue angle of the target color. Perceptually, changes in hue angle are more apparent than changes in lightness or saturation. Since the hue angle is maintained, the lightness and saturation must be altered to bring the target color into the display device color space. If the target color is lighter than the maximum saturation lightness, then the target color is darkened and desaturated to intersect with the display device color space. If the target color is darker than the maximum saturation lightness, then the target color is lightened and desaturated to intersect with the display device color space. While the foregoing gamut mapping technique is preferred, other gamut mapping techniques may be used as display specific transforms to assign valid RGB code values to otherwise undisplayable colors.

In the rendering channel 14, one LUT 106 provides a creative "look" plus a standard film "look" of the type normally imparted by a motion picture print film. The other LUT 108 provides only the creative "look". Since the film produced by the film recorder 38 inherently imparts the film "look" of the particular motion picture print film being used, there is no need in the LUT 108 to provide a standard "look". Only the creative "look" desired by the director needs to be provided. Conversely, in the digitally mastered work that is to be distributed to exhibitors for digital projection, it is necessary to provide both the creative "look" desired by the director and the standard "look" imparted by a particular motion picture print film, since film is not being used in projection. However, the display specific transforms can be omitted at this point, since the projection site can apply these transforms.

Projector specific, and/or creative or film "look" parameters, e.g., LUT entries, can be uploaded to any of the 3D LUTs from the parameter generator 24, thereby providing a mechanism for providing a myriad of "looks", creative effects and projector specific transforms.

In each channel, a further scaling step using a 1D LUT 112 provides bit depth scaling from the 12 bits/channel output of the 3D LUT processing steps to 10 bits/channel, plus any traditional (e.g. gamma adjustment) 1D LUT processing that would need to be done at this point. In the rendering channel 14, the data streams from the separate 1D LUTs 112 would be written to some physical medium (e.g. as a digital master), such as the digital masters 36 and 46 (FIG. 1), respectively. The mastering device for producing such digital masters may simply be the writing capability of a hard drive, a writer for CD/DV ROMs, a magnetic tape recorder, or the like, and the resulting master may be no more than a section of the hard drive, etc. The digitally mastered output could now be used 1) to write image data onto film using a film recorder 38 (e.g. for a release print master) and/or 2) to create a digital cinema distribution master 46 for playback/projection using the digital projector 54.

In the color grading channel 12, either the RGB data is directly provided to the digital display 30 or converted into the color space and sampling ratio expected by the display device, if not 4:4:4 RGB. In the latter case, a color space transformation stage 114 (using a 3×4 matrix conversion) converts from the color space produced by the 3D LUTs 106 and 110 to the output color space for the destination device (e.g. from 4:4:4 RGB projector display primaries to 4:4:4 YCbCr as per ITU 709 and SMPTE 292M). Moreover, it may be necessary at this point to provide down-sampling of source component pixel information in a sampling stage 116 to an output standard such as SMPTE 292M, as would be expected by certain destination display devices (e.g. from a 4:4:4 YCbCr sampling ratio to a 4:2:2 YCbCr sampling ratio).

Depending on the mode of operation of the system (display only, or digital rendering for either projection or film recording), and format of the source or destination image data, some of the processing steps, as explained above, become optional. The key processing step of the digital mastering system is the tone scale and color modeling applications, the creative effects and the display specific transforms that are implemented in the reconfigurable 3D LUTs 106, 108 and 110 as high speed hardware, since the system is intended to operate in real time.

This invention allows for a colorist to more accurately color correct a digitized film source through a system that provides an appearance (and possibly a colorimetric) match between the digitally projected digital source imagery (on the display device 30) and the desired end product (e.g. a projected release film print 40 or digital master 46). This is preferably accomplished on a digital projector, which is an improvement over reliance on a limited color gamut device such as a video monitor. Visualization of external color adjustments made in this "color grading" process is optimal. In addition, the display-only scenario of the system allows for the pre-visualization processing to be customized to incorporate projector specific transformations in the LUT 110 to emulate the desired end product "look" on any given digital projector.

The "digital master" that can be created in the digital rendering channel 14 will more accurately reflect colorists' or other interested stakeholders' intentions and expectations. The color and tone scale of the motion imagery products (e.g. release film prints 40) that can ultimately be produced from the digital master 36 will thus be optimized. Various end products (e.g. digital cinema distribution master 46 or release film print 40) from the same digital master can be optimally pre-visualized through simple changes to this system's 3D look up table setup parameters using the same digital projector 30 to achieve a consistent desired "look" across all end products.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | digital mastering system |
| 12 | color grading preview channel |
| 14 | digital rendering channel |
| 20 | motion picture film scanner |
| 22 | "look" processor |
| 24 | parameter generator |
| 30 | digital display device |
| 32 | "look" processor |
| 34 | line |
| 36 | intermediate master |
| 38 | film recorder |
| 40 | release print film master |
| 42 | "look" processor |
| 44 | line |
| 46 | digital master |
| 48 | digital copies |
| 50 | cinema locations |
| 52 | processor |
| 54 | digital projector |
| 100 | sampling stage |
| 102 | color space transformation stage |
| 104 | 1D LUT |
| 106 | 3D LUT |
| 108 | 3D LUT |
| 110 | 3D LUT |
| 112 | 1D LUT |
| 114 | color space transformation stage |
| 116 | sampling stage |

What is claimed is:

1. A digital mastering system for processing digital image signals originating from a motion image source, said system comprising:

a color grading channel for pre-visualizing a "look" that can be applied to the digital image signals, wherein the "look" includes at least one of appearances produced by either a standard motion image source or adjustments applied to a standard appearance to obtain a creative effect, said color grading channel comprising (a) a parameter generator for generating parameters for a plurality of "looks" corresponding to one or more standard image sources or creative effects, (b) a digital color grading processor for applying one or more selected parameters to impart a pre-visualized "look" to the digital image signals, thereby producing color graded signals that include the pre-visualized "look", wherein the digital color grading processor also applies transforms to the digital image signals that are specific to a particular display device, thereby producing color graded signals that include the pre-visualized "look" and the display specific transforms, (c) a display device capable of reproducing the color graded signals as modified by the display specific transforms that enable emulation of motion print film material; and a digital rendering channel for rendering the digital image signals pre-visualized for a certain "look" into a digital master, wherein the certain "look" includes at least one of said appearances produced by either a standard motion image source or adjustments applied to a standard appearance to obtain a creative effect, said digital rendering channel comprising (a) a digital rendering processor for applying one or more of the parameters selected by the parameter generator for the pre-visualized "look" in order to impart the rendered "look" into the digital image signals independent of any predetermined test signal, thereby producing rendered digital image signals that include the rendered "look" but are devoid of display specific transforms, and (b) a digital mastering device for producing a digital master from the rendered digital image signals.

2. The digital mastering system as claimed in claim 1 wherein the motion image source is a scanned motion picture film.

3. The digital mastering system as claimed in claim 1 wherein the transforms that are specific to a particular display device include an algorithm for re-mapping out of gamut color graded signals into the gamut of the color space of the display device.

4. The digital mastering system as claimed in claim 1 wherein the digital color grading processor applies the "look" associated with both the appearance produced by a standard motion image source and adjustments applied to the standard appearance to obtain a creative effect, and the color graded signals produced therefrom are used to drive a digital projector to display the color graded digital image signals.

5. The digital mastering system as claimed in claim 1 wherein the digital rendering processor applies the "look" associated with adjustments applied to a standard appearance to obtain a creative effect, and the digital master produced therefrom is used to drive a film recorder to record the rendered digital image signals on a motion picture film, wherein the film inherently imparts the appearance produced by a standard motion picture print film.

6. The digital mastering system as claimed in claim 1 wherein the digital rendering processor applies the "look" associated with both the appearance produced by a standard motion image source and adjustments applied to the standard appearance to obtain a creative effect, and the digital master produced therefrom is used to drive a digital projector to display the rendered digital image signals.

7. The digital mastering system as claimed in claim 1 further comprising a film scanner for scanning a motion image source comprising motion picture film and generating a stream of digital image signals corresponding to motion picture images.

8. A color grading system for color grading digital image signals originating from scanned motion picture film, said system comprising:
 a parameter generator for generating parameters for replicating the appearance of a plurality of standard motion picture films;
 a processor for applying tone scale and colorimetry for a selected motion picture print film to the digital image signals, wherein the tone scale and colorimetry are independent of predetermined test signals, thereby generating processed image signals having an appearance corresponding to the motion picture print film, said processor further applying a projector specific transformation to the processed signals, thereby providing transformed signals that are optimized for the gamut of a specific projector; and
 a digital projector having the characteristics of the specific projector for displaying the projector transformed signals.

9. The color grading system as claimed in claim 8 wherein the projector specific transformation includes an algorithm for re-mapping out of gamut processed image signals into the gamut of the color space of the digital projector.

10. The color grading system as claimed in claim 8 wherein the processor comprises a 3D LUT and the parameter generator stores pre-calculated sets of table entries for replicating the appearance of a plurality of standard motion picture films.

11. The color grading system as claimed in claim 8 wherein the processor comprises a first 3D LUT for applying tone scale and colorimetry for a specific motion picture print film to the digital image signals, thereby generating processed image signals having an appearance corresponding to the motion picture print film; and a second 3D LUT for applying a projector specific transformation to the processed signals, thereby providing transformed signals that are optimized for the gamut of a specific projector.

12. The system as claimed in claim 8 wherein the processor applies creative parameters to the digital image signals, in addition to the tone scale and colorimetry for a specific motion picture print film, thereby generating processed image signals having a creative appearance impressed upon the appearance corresponding to the motion picture print film.

13. A digital rendering system for generating a digital master from digital image signals originating from scanned motion picture film, wherein the film was pre-visualized in a color grading operation on a digital display device as modified by display specific transforms, said system comprising:
 a parameter generator for generating look up table entries for replicating the appearances produced by a standard motion picture print film and adjustments applied to a standard appearance to obtain a creative effect;
 a 3-dimensional look up table for applying selected look up table entries from the parameter generator to the digital image signals, wherein the selected look up table entries are independent of predetermined test signals, thereby generating processed image signals having an appearance produced by a standard motion picture print film and adjustments applied to a standard appearance to obtain a creative effect; and
 a writer for generating a digital cinema distribution master from the processed image signals, whereby the digital master is intended for digital projection and the appearance is rendered into the stream of processed image signals devoid of display specific transforms that were applied during the color grading operation.

14. A digital rendering system for generating a digital master of digital image signals originating from scanned motion picture film in accordance with a user's specific creative directions, said system comprising:
 a parameter generator for generating look up table entries for replicating the appearance produced by adjustments applied to a standard appearance of a motion picture film to obtain a creative effect;
 a 3-dimensional look up table for applying selected table look up entries to the digital image signals, wherein the selected look up table entries are independent of predetermined test signals, thereby generating processed image signals having a specific creative appearance corresponding to a user's directions;
 a writer for generating a digital master from the processed image signals; and
 a film recorder for reading the master and recording images corresponding to the processed image signals on motion picture film, whereby the creative appearance is rendered into tone scale and colorimetry of a specific motion picture film by printing the processed digital image signals onto a specific motion picture print film.

15. A method for processing digital image signals originating from a motion image source, said method comprising the steps of:
 color grading the digital image signals by pre-visualizing a "look" that can be applied to the digital image signals, wherein the "look" includes at least one of appearances produced by either a standard motion image source or adjustments applied to a standard appearance to obtain a creative effect, said color grading comprising the steps of
 (a) providing parameters for a plurality of "looks" corresponding to one or more standard image sources or creative effects,
 (b) applying one or more selected parameters to impart a pre-visualized "look" to the digital image signals, thereby producing color graded signals that include the pre-visualized "look", and further applying transforms to the digital image signals that are specific to a particular display device, thereby producing color graded signals that include the pre-visualized "look" and the display specific transforms,
 (c) displaying the color graded signals as modified by the display specific transforms; and
 digitally rendering the digital image signals pre-visualized for a certain "look" into a digital master, wherein the certain "look" includes at least one of said appearances produced by either a standard motion image source or adjustments applied to a standard appearance to obtain a creative effect, said digital rendering comprising the steps of
 (a) applying one or more of the parameters selected by the parameter generator for the pre-visualized "look" in order to impart the rendered "look" into the digital image signals, independent of any predetermined test signal, thereby producing rendered digital image signals that include the rendered "look" but are devoid of display specific transforms, and (b) producing a digital master from the rendered digital image signals.

16. The method as claimed in claim 15 wherein the motion image source is a scanned motion picture film.

17. The method as claimed in claim 15 wherein the step of applying transforms that are specific to a particular display device include applying an algorithm for re-mapping out of gamut color graded signals into the gamut of the color space of the display device.

18. A digital projection system for displaying digital image signals, said system comprising:
 a 3-dimensional lookup table processor for applying predetermined adjustments to the digital image signals in real time, wherein the 3-dimensional lookup table applies tone scale and colorimetry, independent of any predetermined test signal, for a desired appearance associated with a motion picture print film; thereby generating processed digital image signals suitable for projection by the digital projection system; and
 a digital projector for displaying the processed digital image signals.

19. The system as claimed in claim 18 wherein the 3-dimensional lookup table processor comprises a 3-dimensional lookup table that applies tone scale and colorimetry adjustments associated with a desired appearance that is to be produced in imagery displayed by the digital projector.

20. The system as claimed in claim 19 wherein the 3-dimensional lookup table generates processed image signals having an appearance corresponding to the motion picture print film.

21. The system as claimed in claim 20 wherein the 3-dimensional lookup table processor comprises a second 3-dimensional look up table for further applying a projector specific transformation to the processed signals, thereby providing transformed signals that are optimized for the gamut of a specific projector.

22. The system as claimed in claim 18 wherein the 3-dimensional lookup table processor comprises a 3-dimensional lookup table that applies a projector specific transformation to the processed signals, thereby providing transformed signals that are optimized for a gamut of the digital projector.

23. A method for displaying digital image signals representative of a motion picture, said method comprising the steps of:
 processing the digital image signals with a 3-dimensional lookup table for applying predetermined adjustments to the digital image signals in real time, wherein the 3-dimensional lookup table applies tone scale and colorimetry for a desired appearance associated with a motion picture print film, independent of any predetermined test signal; thereby generating processed digital image signals suitable for projection by the digital projection system; and
 displaying the processed digital image signals with a digital projector.

24. The method as claimed in claim 23 wherein the 3-dimensional lookup table applies tone scale and colorimetry adjustments associated with a desired appearance that is to be produced in imagery displayed by the digital projector.

25. The method as claimed in claim 24 further comprising the step of generating processed image signals having an appearance corresponding to the motion picture print film.

26. The method as claimed in claim 23 wherein the 3-dimensional lookup table applies a projector specific transformation to the processed signals, thereby providing transformed signals that are optimized for a gamut of the digital projector.

27. The method as claimed in claim 23 wherein the step of processing the image signals with a 3-dimensional lookup table comprises processing the image signals with a first 3-dimensional lookup table for applying the tone scale and colorimetry for a desired appearance associated with the selected motion picture print film, thereby generating processed image signals having an appearance corresponding to the motion picture print film, and processing the image signals with a second 3-dimensional lookup table for further applying a projector specific transformation to the processed signals, thereby providing transformed signals that are optimized for the gamut of a specific projector.

* * * * *